(12) United States Patent
Chen

(10) Patent No.: US 7,994,744 B2
(45) Date of Patent: Aug. 9, 2011

(54) METHOD OF CONTROLLING SPEED OF BRUSHLESS MOTOR OF CEILING FAN AND THE CIRCUIT THEREOF

(75) Inventor: Chien-Hsun Chen, Taichung (TW)

(73) Assignee: Rhine Electronic Co., Ltd., Taichung County (TW)

( * ) Notice: Subject to any disclaimer, the term of this patent is extended or adjusted under 35 U.S.C. 154(b) by 539 days.

(21) Appl. No.: 12/209,037

(22) Filed: Sep. 11, 2008

(65) Prior Publication Data

US 2010/0060224 A1   Mar. 11, 2010

(51) Int. Cl.
*H02P 6/06* (2006.01)
(52) U.S. Cl. ............. 318/268; 318/400.03; 318/430
(58) Field of Classification Search .......... 318/268, 318/400.01, 400.03, 400.11, 430, 431
See application file for complete search history.

(56) References Cited

U.S. PATENT DOCUMENTS

| 4,546,293 | A | * | 10/1985 | Peterson et al. | 318/400.14 |
| 5,309,077 | A | * | 5/1994 | Choi | 318/799 |
| 5,748,206 | A | * | 5/1998 | Yamane | 347/37 |
| 2007/0182350 | A1 | * | 8/2007 | Patterson et al. | 318/432 |

* cited by examiner

*Primary Examiner* — Bentsu Ro
(74) *Attorney, Agent, or Firm* — Browdy and Neimark, PLLC

(57) ABSTRACT

The present invention relates to a method and a circuit of controlling a speed of a brushless motor of a ceiling fan. The circuit includes a motor PWM duty consumption sampling unit and a motor speed sampling to sense a PWM duty and a speed of the brushless motor. A central processing unit is provided to compare the PWM duty and the speed of the brushless motor to a preset maximum PWM duty and a preset maximum speed. When the PWM duty reaches to the preset maximum PWM duty first, the central processing unit sets the current speed to be a maximum speed, and speeds of each level are calculated according to the maximum speed. If the speed reaches to the preset maximum speed first, a constant-speed control will take over to control the brushless motor, and speeds of each level are according to the preset speeds.

11 Claims, 5 Drawing Sheets

METHOD OF CONTROLLING SPEED OF BRUSHLESS MOTOR OF CEILING FAN AND THE CIRCUIT THEREOF

BACKGROUND OF THE INVENTION

1. Field of the Invention

The present invention relates to a ceiling fan and more particularly, to a method of controlling a speed of a brushless motor of a ceiling fan and the circuit thereof.

2. Description of the Related Art

In the market, a conventional ceiling fan usually takes a speed of a rotation of fans as a main control parameter. To control the fans by a constant-speed control system, the manufactures usually set different output PWM (Pulse Width Modulation) duties according to the loadings of the fan in the factory that the fans rotate in different speeds according to the set output PWM duties. In this way, the control program will provides variable settings according to the loadings of the fans that it has a problem for customization.

The fans of the ceiling fans usually have different sizes, different shapes, and different materials that will produce variable types of fans. However, the set output PWM duties are invariable that the ceiling may not work according to the original setting when the fans are replaced by different types of fans. For example, when the fans are replaced by heavier fans, the loading of motor will increase and only rotate the fans in a slower speed. However, the constant-speed control system will detect the speed is slower and call the motor providing more PWM duty. At the end of this condition, the motor may burn because of overheat and overload. In conclusion, it is not enough to control the speed of the ceiling by the constant-speed control system.

SUMMARY OF THE INVENTION

The primary objective of the present invention is to provide a method of controlling a dynamic loading and PWM duty limited speed of a brushless motor of a ceiling fan and the circuit thereof, which combines constant PWM duty and constant speed.

To achieve the objective of the present invention, the present invention includes a motor pulse width modulation (PWM) duty consumption sampling unit and a motor speed sampling to sense a PWM duty and a speed of the brushless motor. A central processing unit is provided to compare the PWM duty and the speed of the brushless motor to a preset maximum PWM duty and a preset maximum speed. When the PWM duty of the brushless motor reaches to the preset maximum PWM duty first, the central processing unit sets the current speed to be a maximum speed, and speeds of each level are calculated according to the maximum speed. If the speed of the brushless motor reaches to the preset maximum speed first, a constant-speed control will take over to control the brushless motor, and speeds of each level are according to the preset speeds.

DETAILED DESCRIPTION OF THE INVENTION

Figure 1:
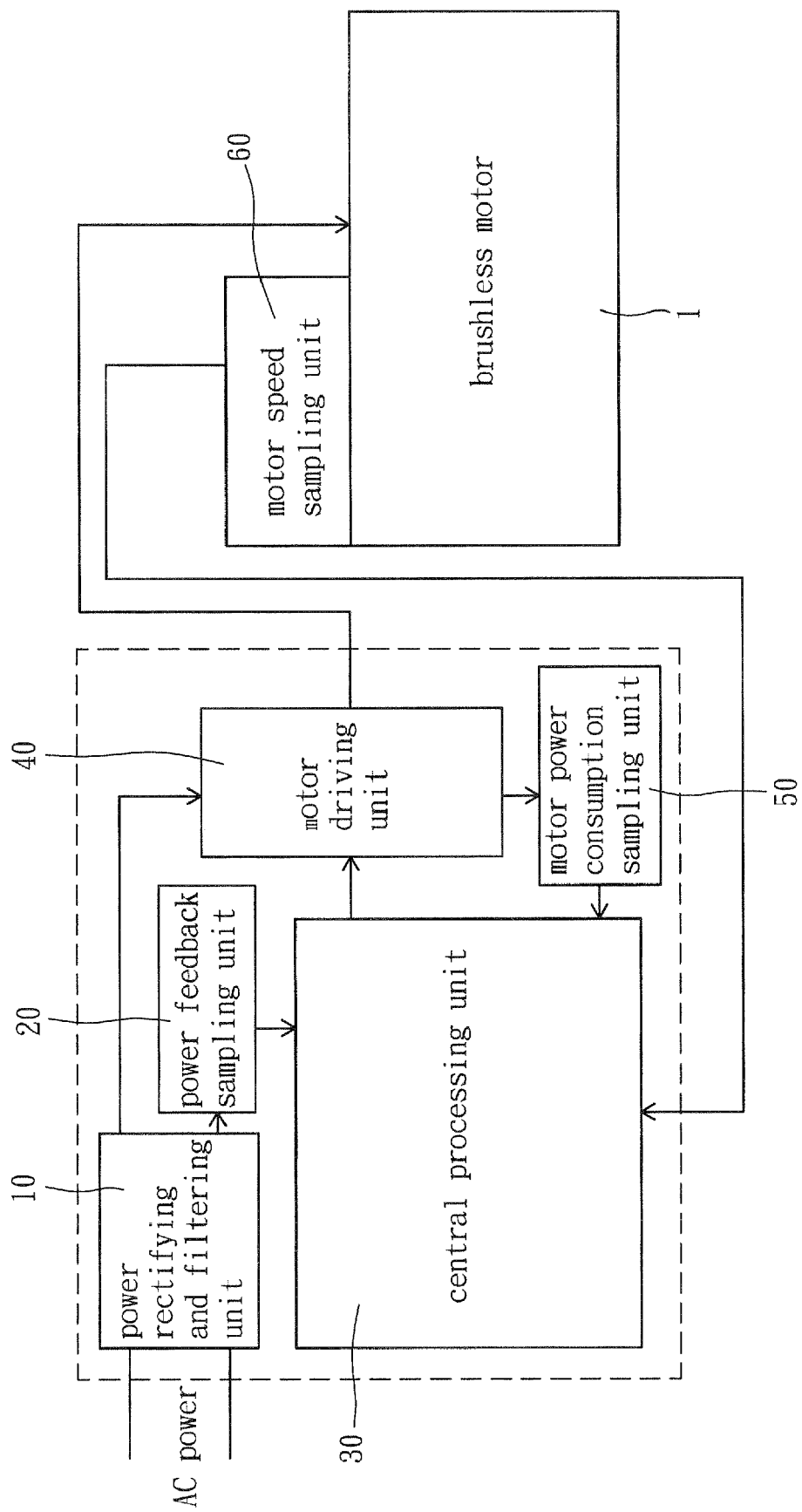
FIG. 1 is a block diagram of a preferred embodiment of the present invention.
Figure 2:
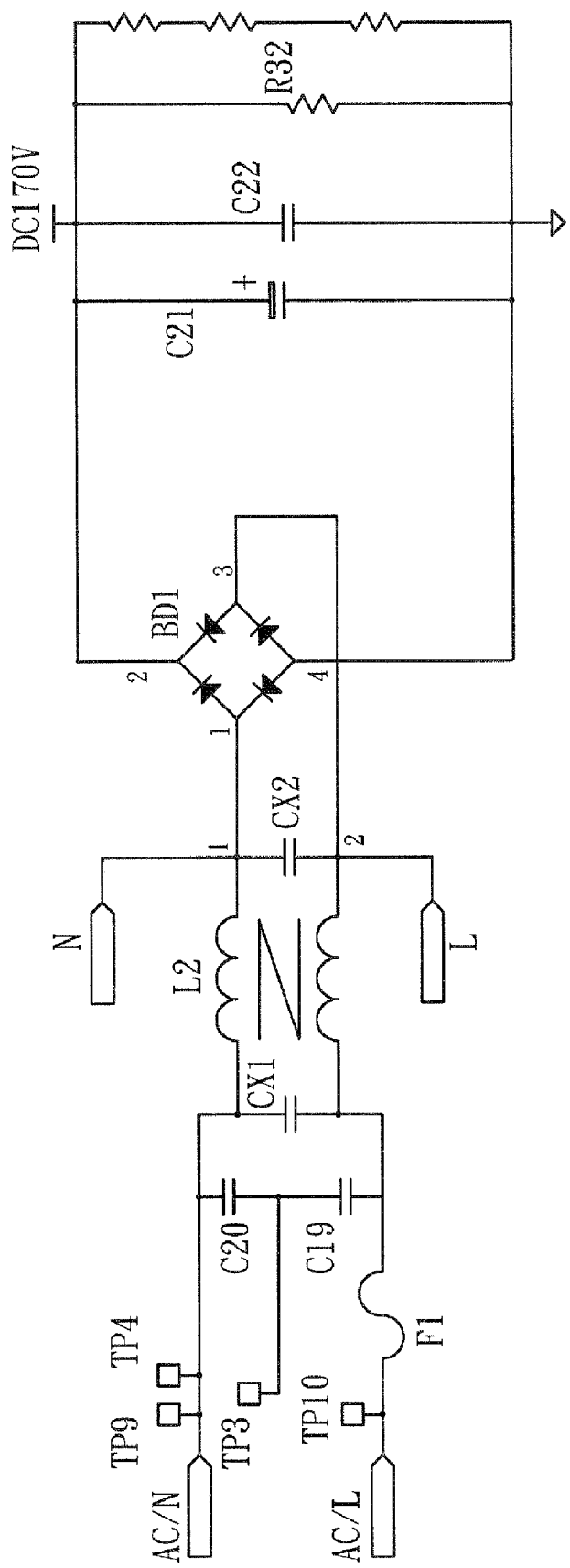
FIG. 2 is a circuit diagram of the PWM duty rectifying and filtering of the preferred embodiment of the present invention.

Referring to FIG. 1, a circuit for controlling a speed and a loading of a brushless motor of a ceiling fan of the preferred embodiment of the present invention, which the circuit is provided in the ceiling fan and electrically connected to the brushless motor 1, includes:

A PWM (Pulse Width Modulation) duty rectifying and filtering unit 10 is connected to an AC power to transfer an AC current to a DC current, as shown in FIG. 2.

An AC power feedback unit 20 is connected to the PWM duty rectifying and filtering unit 10 to monitor the AC power and output a voltage detected signal, as shown in FIG. 2.

A central processing unit 30, which has control programs therein, is connected to the AC power feedback unit 20 to receive the voltage detected signal thereof.

A motor driving unit 40 is connected to the PWM duty rectifying and filtering unit 10 and the central processing unit 30. The central processing unit 30 produces a three-phase voltage and transmits it to the three-phase brushless motor 1 for driving it.

Figure 3:
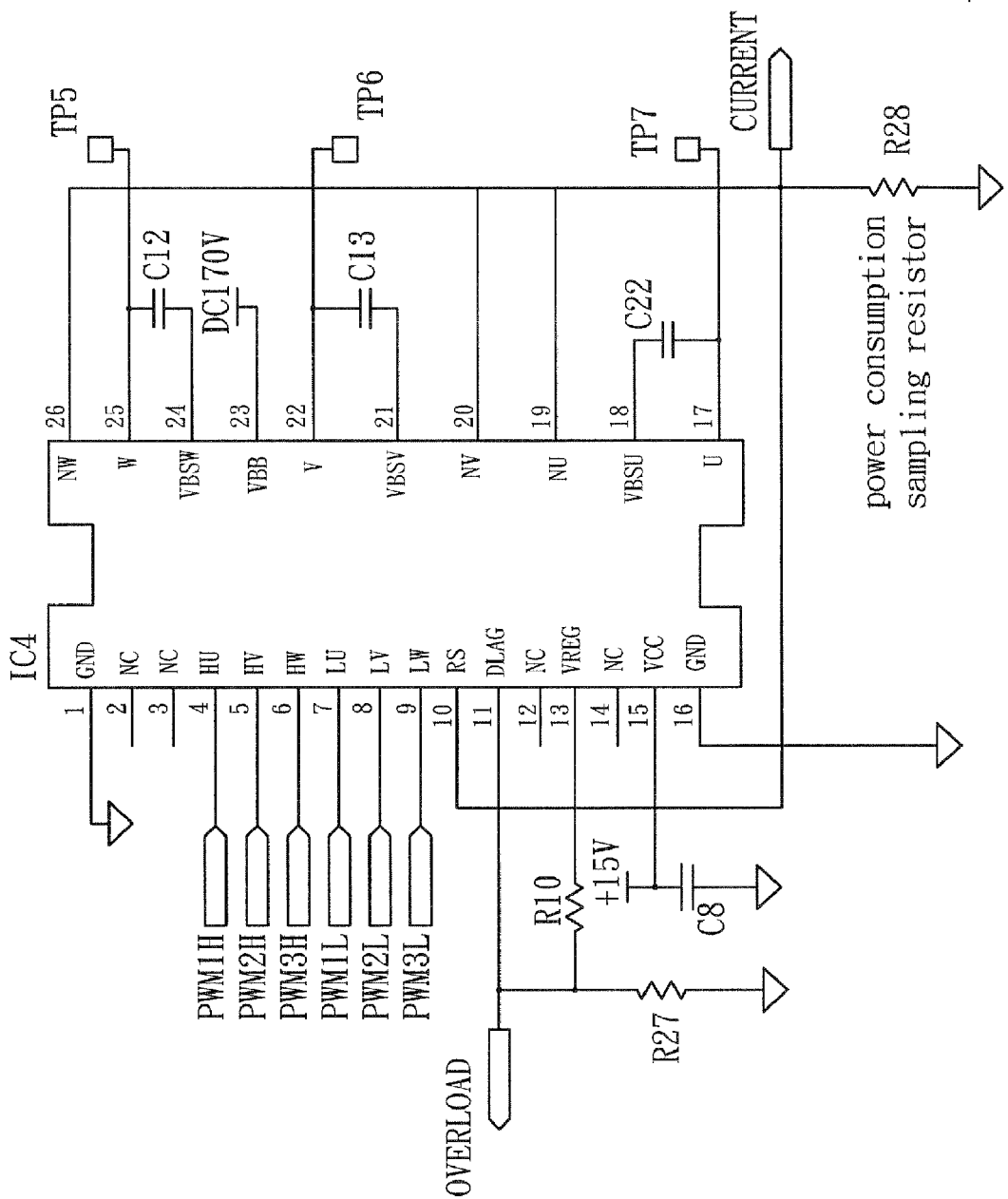
FIG. 3 and FIG. 4 are circuit diagrams of the sampling unit of the PWM duty consumption of the motor of the preferred embodiment of the present invention.
Figure 4:
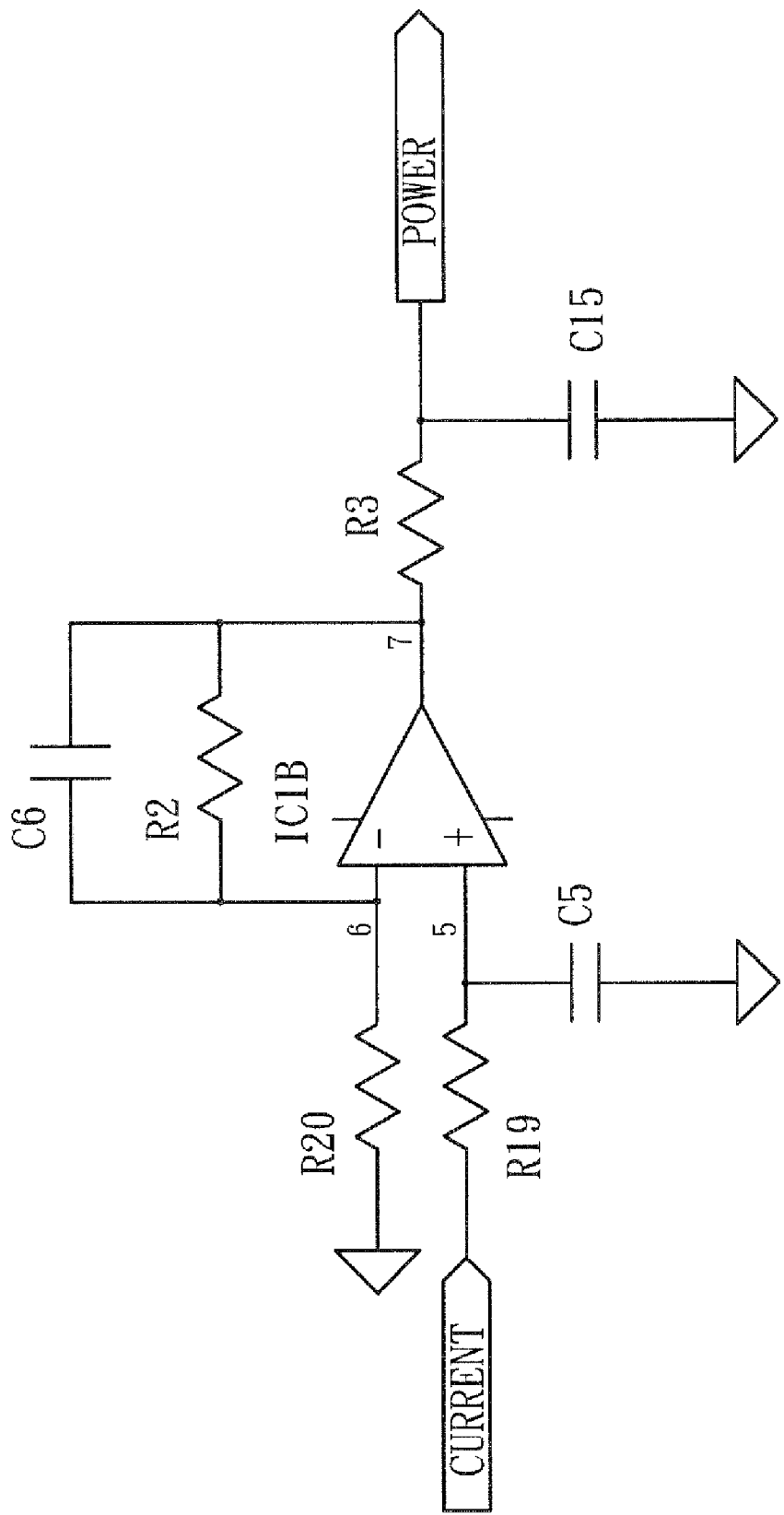

A motor PWM (Pulse Width Modulation) duty consumption sampling unit 50 is connected to the motor driving unit 40 and the central processing unit 30 to sample a total consumed current and to transform it into a digital signal for transmitting to the central processing unit 30. FIG. 3 and FIG. 4 show a practical circuit of the motor PWM duty consumption sampling unit 50, in which a current sensor transforms the total current into a voltage signal and then an OP amplifier amplifies the voltage signal to be integrated into a DC current, and then the DC current is sent to the central processing unit 30 and transformed into a digital signal to get a parameter of total PWM duty consumption.

A motor speed sampling unit 60 is connected to the central processing unit 30 to get a speed signal from the brushless motor 1 and transmit it to the central processing unit 30 that the central processing unit 30 may have the information of the current speed of the brushless motor 1. The motor speed sampling unit 60 may have an optical electronic device or a HALL sensor to sense the speed and feedback a square wave signal to the central processing unit 30. A relation of the frequency of the square wave signal and the speed is:

$$N=(120 \times F)/P$$

Wherein:

N: speed;

F: frequency of the square wave signal; and

P: numbers of magnetic poles of the magnets of the motor.

When the central processing unit 30 reads the set PWM duty relative to the voltage, it will get a speed parameter relative to the set PWM duty.

Figure 5:
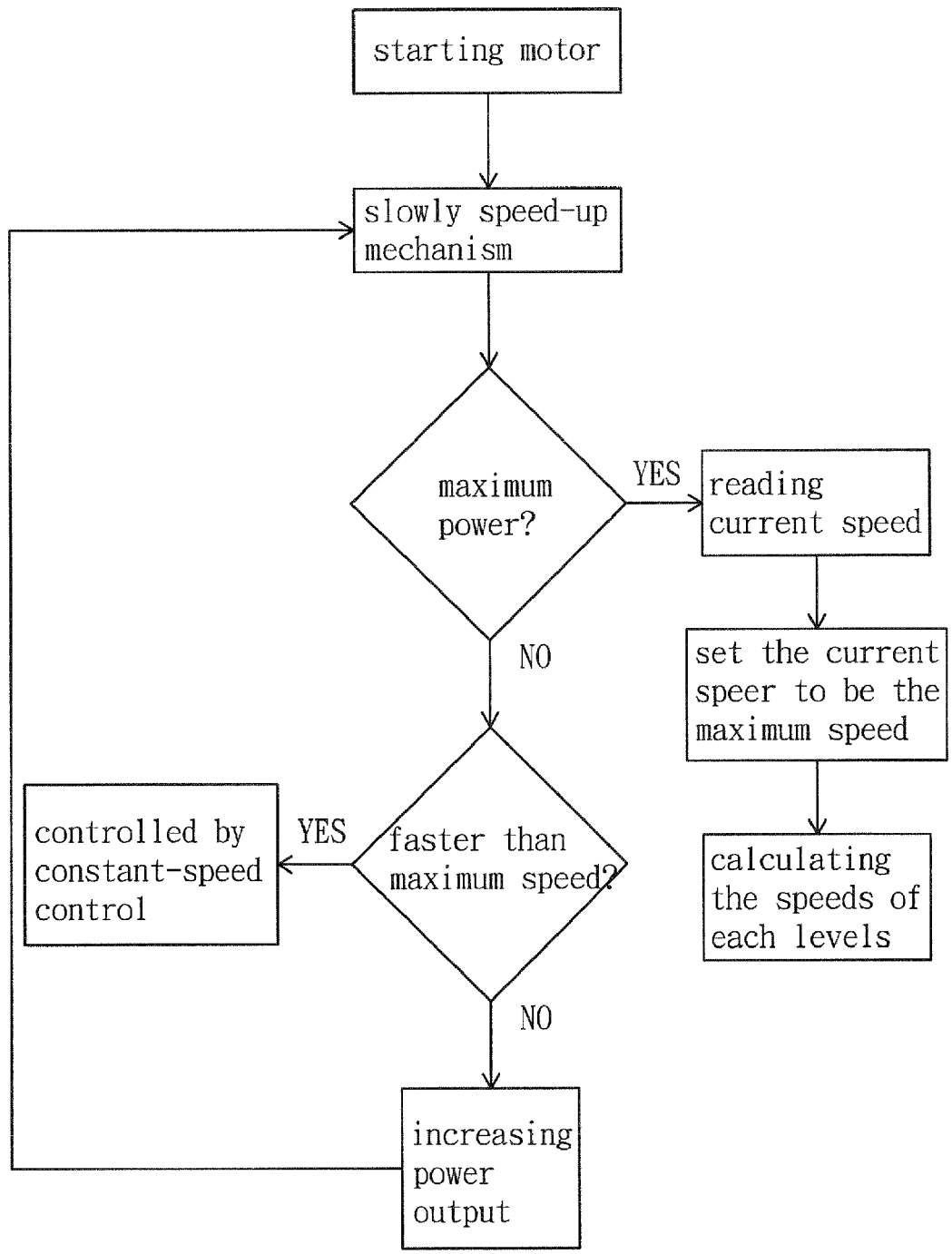
FIG. 5 is a flow chart of the control method of the preferred embodiment of the present invention.

FIG. 5 shows a flow chart of the control process of the present invention. The central processing unit 30 has a preset maximum PWM duty and a preset maximum speed. When the brushless motor 1 is started, it is set to be controlled by PWM duty, and then the central processing unit 30 will increase the power output, and the motor PWM duty consumption sampling unit 50 and the motor speed sampling unit 60 are sensing the brushless motor 1 and send signals to the central processing unit 30 for determination of whether it reaches to the preset maximum PWM duty. When the central processing unit 30 reads the brushless motor 1 arriving at the preset maximum PWM duty before the preset maximum speed, the current speed of the brushless motor 1, which is sensed by the motor speed sampling unit 60, is set to be a maximum speed. The central processing unit 30 will calculate speeds of different levels according to the maximum speed automatically. When the central processing unit 30 reads the brushless motor 1 arriving at the preset maximum speed before the preset maximum PWM duty, the central processing unit 30 will control the brushless motor 1 according to a constant-speed control and the speeds of the levels are preset in the control program.

A circuit mounted in the ceiling fan and connected to the brushless motor to achieve the present invention will be described hereunder. When the brushless motor 1 is started, and the central processing unit 30 are increasing the power outputting to the brushless motor 1, the motor PWM duty consumption sampling unit 50 and the motor speed sampling unit 60 are sensing the brushless motor 1 to monitor the PWM duty and the speed thereof. The control program control the power output in a slow increasing mode to avoid surge in speeding up the motor 1. The central processing unit 30 is monitoring the brushless motor 1 through the motor PWM duty consumption sampling unit 50 and the motor speed sampling unit 60 to get a speed parameter and a PWM duty consumption parameter. When the speed parameter is increasing, the PWM duty consumption parameter will be sensed, and when the PWM duty consumption parameter keeps still, which means an average of several continuous PWM duty consumption parameters are not changed, it will adjust the power output to speed up. It will avoid surge.

When the power reaches to the preset PWM duty, the current speed of the brushless motor 1 is read to be the maximum speed that the control program will calculate the speeds of different levels according to the maximum speed. In the condition of the speed of the brushless motor 1 arriving at the preset maximum speed and the current PWM duty smaller than the preset maximum PWM duty, the central processing unit 30 will stop increasing the power output and control the brushless motor 1 by the constant-speed control. The speeds of each level are preset in the program without having to change the settings.

In conclusion, the present invention provides the brushless motor being controlled by both of the constant-speed control and the PWM duty control. It will not occur overload of the brushless motor. Furthermore, the present invention may be applied in every type of fans.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method of controlling a speed of a brushless motor of a ceiling fan, comprising the steps of:
    speeding up the brushless motor;
    sensing a speed and a pulse width modulation (PWM) duty of the brushless motor; and
    comparing the speed of the brushless motor with a preset maximum speed, and comparing the PWM duty of the brushless motor with a preset maximum PWM duty;
    wherein when the PWM duty of the brushless motor is identical to the preset maximum PWM duty and the speed of the brushless motor is less than the preset maximum speed, the speed of the brushless motor is set to be a maximum speed, and when the speed of the brushless motor is identical to the preset maximum speed and the PWM duty of the brushless motor is less than the preset maximum PWM duty, the brushless motor is stopped speeding up and a constant-speed control will control the brushless motor according to preset speeds of each level.

2. The method as claimed in claim 1, wherein the PWM duty of the brushless motor is sensed by a motor PWM duty sampling unit, and the motor PWM duty sampling unit sends signals of the PWM duty of the brushless motor to a central processing unit to be compared with the present maximum PWM duty.

3. The method as claimed in claim 1, wherein the speed of the brushless motor is sensed by a motor speed sampling unit, and the motor speed sampling unit sends signals of the speed of the brushless motor to a central processing unit to be compared with the present maximum speed.

4. The method as claimed in claim 1, further comprising the step of calculating speeds of each level according to the maximum speed when the PWM duty of the brushless motor is identical to the preset maximum PWM duty and the speed of the brushless motor is less than the preset maximum speed.

5. The method as claimed in claim 1, wherein the speed parameter is increasing, the PWM duty consumption parameter will be sensed and when an average of several continuous PWM duty consumption parameters are not changed, the power output will increase to speed up and it will avoid surge.

6. A circuit for controlling a speed of a brushless motor of a ceiling fan, comprising:
    a power rectifying and filtering unit connected to an AC power to transform the AC power to a DC power;
    an AC power feedback unit connected to the power rectifying and filtering unit to monitor the AC power and to output voltage signals of the AC power;
    a central processing unit, which has a control program therein, connected to the AC power feedback unit and to receive the voltage signals;
    a motor driving unit connected to the power rectifying and filtering unit and the central processing unit to be controlled by the central processing unit for driving the brushless motor;
    a motor pulse width modulation (PWM) duty consumption sampling unit connected to the motor driving unit and the central processing unit to sense a current consumption of the motor driving unit and to transform the current consumption into a voltage signal, and the voltage signal is sent to the central processing unit; and
    a motor speed sampling unit connected to the motor driving unit and the central processing unit to sense a speed signal of the brushless motor, and the speed signal is sent to the central processing unit;
    wherein the central processing unit receives both of the voltage signal and the speed signal from the motor PWM duty sampling unit and the motor speed sampling unit respectively to have a relation of a PWM duty and the speed of the brushless motor.

7. The circuit as claimed in claim 6, wherein the motor PWM duty sampling unit has a current sensor to transform the current consumption into the voltage signal and an OP amplifier to amplifies the voltage signal to be integrated into a DC current for sending to the central processing unit to be transformed into a digital signal.

8. The circuit as claimed in claim 6, wherein the motor speed sampling unit has an optical electronic device or a HALL sensor to sense the speed of the brushless motor.

9. The circuit as claimed in claim 6, wherein the central processing unit provides a control signal to the motor driving unit to generate a three-phase voltage for controlling the brushless motor.

10. The circuit as claimed in claim 6, wherein the motor speed sampling unit provides a square wave signal to the central processing unit according to the speed signal.

11. The circuit as claimed in claim 10, wherein a relation of a frequency of the square wave signal and the speed is $$N=(120\times F)/P$$

Wherein:
- N: the speed;
- F: the frequency of the square wave signal; and
- P: numbers of magnetic poles of magnets of the brushless motor.

* * * * *